United States Patent
Shimoyama (10) Patent No.: US 8,018,101 B2
(45) Date of Patent: Sep. 13, 2011

(54) MOTOR

(75) Inventor: Takeshi Shimoyama, Nagano (JP)

(73) Assignee: Nidec Sankyo Corporation (JP)

( * ) Notice: Subject to any disclaimer, the term of this patent is extended or adjusted under 35 U.S.C. 154(b) by 142 days.

(21) Appl. No.: 12/496,075

(22) Filed: Jul. 1, 2009

(65) Prior Publication Data

US 2010/0001594 A1 Jan. 7, 2010

(30) Foreign Application Priority Data

Jul. 1, 2008 (JP) .................................. 2008-172375

(51) Int. Cl.
- *H02K 5/24* (2006.01)
- *H02K 5/00* (2006.01)
- *H02K 5/16* (2006.01)
- *H02K 37/00* (2006.01)

(52) U.S. Cl. ........... 310/51; 310/89; 310/90; 310/49.01; 310/40 MM; 310/96

(58) Field of Classification Search ............ 310/40 MM, 310/49.01, 51, 89, 90, 91, 96; *H02K 5/16, H02K 37/00, 5/00*
See application file for complete search history.

(56) References Cited

U.S. PATENT DOCUMENTS

| | | | | |
|---|---|---|---|---|
| 5,811,903 A * | 9/1998 | Ueno et al. | ...................... | 310/90 |
| 6,208,046 B1 * | 3/2001 | Lee | ............................. | 310/49.01 |
| 6,541,886 B2 * | 4/2003 | Mayumi | ......................... | 310/91 |
| 6,700,261 B2 * | 3/2004 | Mayumi | ......................... | 310/91 |
| 6,836,034 B2 * | 12/2004 | Hsu et al. | ................... | 310/49.25 |
| 6,910,564 B2 * | 6/2005 | Mochizuki | ................. | 192/84.92 |
| 2002/0084709 A1 * | 7/2002 | Yajima et al. | .................. | 310/90 |
| 2003/0178897 A1 * | 9/2003 | Jun | ................................ | 310/90 |
| 2004/0075354 A1 * | 4/2004 | Hsu et al. | ........................ | 310/90 |
| 2005/0110351 A1 * | 5/2005 | Shimoyama | ................ | 310/49 A |
| 2005/0285473 A1 * | 12/2005 | Kobayashi | .................... | 310/261 |
| 2006/0179447 A1 * | 8/2006 | Yang et al. | ..................... | 720/676 |
| 2006/0284496 A1 * | 12/2006 | Mizumaki | .................. | 310/49 R |
| 2007/0085433 A1 * | 4/2007 | Agematsu | ....................... | 310/90 |
| 2007/0216243 A1 * | 9/2007 | Agematsu | ....................... | 310/90 |
| 2007/0222313 A1 * | 9/2007 | Sonohara et al. | ............... | 310/90 |
| 2008/0088209 A1 * | 4/2008 | Ryu | .............................. | 310/49 R |
| 2009/0309429 A1 * | 12/2009 | Ryu et al. | ..................... | 310/49.01 |
| 2010/0001594 A1 * | 1/2010 | Shimoyama | .................... | 310/51 |

FOREIGN PATENT DOCUMENTS

| | | |
|---|---|---|
| JP | 6-98522 A | 4/1994 |
| JP | 2005-269733 A | 9/2005 |
| JP | 2007-104849 A | 4/2007 |

* cited by examiner

*Primary Examiner* — Quyen Leung
*Assistant Examiner* — John K Kim
(74) *Attorney, Agent, or Firm* — Cantor Colburn LLP (57) ABSTRACT

A motor may include a rotor having a rotation shaft, a stator disposed on an outer peripheral side of the rotor, an output side bearing which supports an end part on an output side of the rotation shaft in a radial direction and an axial direction, a frame which is provided with a bearing holding part for holding the output side bearing and which is fixed to the stator, and an urging member which is attached to the bearing holding part for urging the output side bearing to an opposite-to-output side. The bearing holding part is formed with a bearing hole which penetrates through the bearing holding part and on which the output side bearing is disposed, and the output side bearing is disposed on the bearing hole in a movable state in the axial direction of the rotation shaft.

9 Claims, 8 Drawing Sheets

MOTOR

CROSS REFERENCE TO RELATED APPLICATION

The present invention claims priority under 35 U.S.C. §119 to Japanese Application No. 2008-172375 filed Jul. 1, 2008, which is incorporated herein by reference.

FIELD OF THE INVENTION

An embodiment of the present invention may relate to a motor in which an end part on an output side of a rotation shaft is supported.

BACKGROUND OF THE INVENTION

A stepping motor having a lead screw which is formed on a tip end side of a rotation shaft protruding from its stator has been conventionally used for moving a lens and the like provided in an optical pickup device used in a CD or a DVD player or provided in a camera. As this type, a stepping motor has been known in which a tip end part of a rotation shaft is supported by a bearing and a flat spring (see, for example, Japanese Patent Laid-Open No. 2007-104849, Japanese Patent Laid-Open No. 2005-269733, and Japanese Patent Laid-Open No. Hei 6-98522).

In the stepping motor described in the above-mentioned Patent References, a bearing held by a frame, which is fixed to a stator, supports a tip end part of a rotation shaft in a radial direction. Further, in this stepping motor, a flat spring is abutted with the tip end of the rotation shaft to urge the rotation shaft in an opposite-to-output side so that the flat spring supports the tip end part of the rotation shaft in a thrust direction (axial direction). The bearing is fixed to the frame by press-fitting or the like. In this stepping motor, an engagement part for engaging with the frame is formed in the flat spring and the flat spring is attached to the frame by utilizing elastic deformation of the engagement part.

The rotation shaft is generally formed of stainless steel in many cases because a small surface roughness and a high abrasion resistance are required in the lead screw portion which is formed on the rotation shaft. Further, the flat spring is also generally formed of stainless steel plate in many cases.

As described above, both of the rotation shaft and the flat spring are often formed of stainless steel. However, in the stepping motor described in the above-mentioned Patent References, the flat spring for supporting the tip end part of the rotation shaft in the thrust direction is abutted with the tip end of the rotation shaft. Therefore, in this stepping motor, for example, when the rotation shaft and the flat spring formed of stainless steel are used, the same type of metals are slid or contacted with each other during rotation of the rotation shaft. As a result, in this stepping motor, noise is easily occurred at the time of rotation of the rotation shaft and abrasion is easily occurred in the rotation shaft and the flat spring and thus its durability is not satisfactory.

SUMMARY OF THE INVENTION

In view of the problems described above, at least an embodiment of the present invention may advantageously provide a motor which is capable of restraining occurrence of noise during rotation of the rotation shaft and reducing abrasion or wear of the rotation shaft and the urging member for urging the rotation shaft in the axial direction.

According to at least an embodiment of the present invention, there may be provided a motor including a rotor having a rotation shaft, a stator which is disposed on an outer peripheral side of the rotor, an output side bearing which supports an end part on an output side of the rotation shaft in a radial direction and an axial direction, a frame which is provided with a bearing holding part for holding the output side bearing and which is fixed to the stator, and an urging member which is attached to the bearing holding part for urging the output side bearing to an opposite-to-output side. The bearing holding part is formed with a bearing hole which penetrates through the bearing holding part and on which the output side bearing is disposed, and the output side bearing is disposed on the bearing hole in a movable state in the axial direction of the rotation shaft.

In the motor in accordance with an embodiment of the invention, the rotation shaft is disposed on a bearing hole in a movable state in an axial direction of the rotation shaft and the output side bearing which is urged by an urging member toward the opposite-to-output side supports the rotation shaft in the axial direction. Therefore, the urging member and the rotation shaft are not abutted with each other. Accordingly, occurrence of noise due to sliding or contacting of the rotation shaft with the urging member during rotation of the rotation shaft is prevented and wear of the rotation shaft and the urging member is prevented. As a result, in the embodiment of the present invention, occurrence of noise during rotation of the rotation shaft is restrained and wear of the rotation shaft and the urging member is reduced.

Further, since the output side bearing is urged by the urging member toward the opposite-to-output side, the opposite-to-output side bearing which is attached to the end face on the opposite-to-output side of the stator is structured to be a non-movable bearing and thus the bearing structure on the opposite-to-output side can be simplified. In this case, the opposite-to-output side bearing may be structured to rotatably support the end part on the opposite-to-output side of the rotation shaft in the axial direction and the radial direction. Specifically, it may be structured that the opposite-to-output side bearing is formed in a bottomed cylindrical shape having a bearing recessed part, and the end part on the opposite-to-output side of the rotation shaft is inserted into the bearing recessed part to be abutted with a bottom face of the bearing recessed part.

In accordance with an embodiment of the present invention, the bearing hole is formed by press blanking work so that a length of sheared face in the axial direction of the rotation shaft is longer than a length of fracture face on the inner peripheral face of the bearing hole. According to this structure, the surface of the inner peripheral face of the bearing hole is relatively made smooth. Further, unevenness formed on the sheared face is smaller than unevenness formed on the fracture face and the region of the sheared face which is smoother than the fracture face is secured longer and thus variation of diameter of the bearing hole in the axial direction is restrained and inclination of the output side bearing which is disposed on the bearing hole is suppressed. Therefore, the output side bearing which is disposed on the bearing hole is capable of being smoothly moved in the axial direction.

In accordance with an embodiment of the present invention, the urging member is a flat spring. According to this structure, the structure for urging the output side bearing is capable of being simplified.

In accordance with an embodiment of the present invention, the flat spring is attached to an output side face of the bearing holding part and the flat spring is provided with a slipping-out preventive part for preventing coming-off of the output side bearing from the bearing hole. In addition, in accordance with an embodiment of the present invention, a through hole is formed at a center portion of the flat spring so as to penetrate through the flat spring, and the slipping-out preventive part comprises a plurality of protruded parts which is protruded toward the center side of the flat spring from an edge of the through hole for preventing coming-off of the output side bearing toward the output side. According to this structure, the output side bearing is not required to form the slipping-out preventive part in itself. Therefore, the structure of the output side bearing is simplified to be capable of reducing the size of the output side bearing. As a result, the size of the motor in the axial direction can be reduced. Further, the structure of the output side bearing is capable of being simplified and thus, even when the size of the output side bearing is small, the output side bearing can be manufactured easily.

In accordance with an embodiment of the present invention, the output side bearing is provided with a plurality of projecting parts projecting toward the output side and the protruded part of the flat spring is disposed between the plurality of the projecting parts. According to this structure, rotation quantity of the output side bearing to the bearing hole is restricted by utilizing a plurality of the protruded parts of the flat spring and a plurality of the projecting parts, in other words, a turning prevention mechanism is structured. Therefore, movement in the rotating direction of the output side bearing within the bearing hole is restricted with a simple structure.

In accordance with an embodiment of the present invention, the flat spring is provided with a bearing abutting part which is protruded toward the center side of the flat spring from the edge of the through hole to abut with and urge the output side bearing, and the bearing abutting part is disposed between the plurality of the projecting parts, and a difference between a distance in the circumferential direction between the projecting parts, which are disposed on both sides of the protruded part in the circumferential direction of the rotation shaft, and a width of the protruded part in the circumferential direction is smaller than a difference between a distance in the circumferential direction between the projecting parts, which are disposed on both sides of the bearing abutting part in the circumferential direction of the rotation shaft, and a width of the bearing abutting part in the circumferential direction. According to this structure, the bearing abutting part is prevented by the projecting parts from coming in contact with other structure members and a finger of a user. Further, even when the output side bearing is rotated with rotation of the rotation shaft, contact of the bearing abutting part with the projecting part is prevented. Therefore, the output side bearing is adequately urged by the bearing abutting part.

In accordance with an embodiment of the present invention, the flat spring is provided with a bearing abutting part which is abutted with the output side bearing to urge the output side bearing, and the output side bearing is formed with an arranging recessed part which is recessed toward the opposite-to-output side from the output side end of the output side bearing for accommodating the bearing abutting part. According to this structure, since the bearing abutting part is disposed within the arranging recessed part, the size of the motor in the axial direction can be reduced. Further, the bearing abutting part is prevented from coming in contact with other structure members and a finger of a user.

In accordance with an embodiment of the present invention, a spring abutting part with which the bearing abutting part is abutted is formed at a center position in the radial direction of the arranging recessed part, and the spring abutting part is formed in a conical shape which is protruded toward its tip end side, and the output side bearing is provided with a plurality of projecting parts which are protruded toward the output side, and the bearing abutting part is disposed between the plurality of the projecting parts, and a protruded amount of the spring abutting part is smaller than a projecting amount of the projecting part. In other words, in this embodiment, the bearing abutting part of the flat spring does not protrude from the tip end of the output side bearing. Therefore, the size of the motor in the axial direction can be reduced. Further, the bearing abutting part can be prevented from contacting with a structure member of the host device on which the motor is mounted or a finger of a user. Therefore, deformation of the bearing abutting part due to contacting with the structure member of the host device is prevented and an appropriate urging force of the flat spring is maintained. Further, since contacting of a finger of a user with the bearing abutting part is prevented, the user is prevented from being hurt.

In accordance with an embodiment of the present invention, a through hole penetrating through the flat spring is formed on a center side of the flat spring, and a plurality of protruded parts are provided which is protruded toward the center side of the flat spring from the edge of the through hole, and the projecting part is formed at least three positions with a predetermined space in a circumferential direction between respective projecting parts, and the plurality of the protruded parts are respectively disposed between the projecting parts which are located on both sides with the projecting parts between which the bearing abutting part is disposed as a center. According to this structure, coming-off of the output side bearing from the bearing hole is prevented by the protruded part. Further, rotation quantity of the output side bearing to the bearing hole is restricted by utilizing the protruded part and the projecting part, in other words, a turning prevention mechanism is structured and thus movement in the rotating direction of the output side bearing within the bearing hole is restricted with a simple structure. In addition, moving amount in the axial direction of the output side bearing to the bearing hole is secured by utilizing the projecting part.

In accordance with an embodiment of the present invention, a portion between the plurality of the projecting parts is formed in a flat part perpendicular to the axial direction, and a space between the flat part, the spring abutting part and the tip end of the output side bearing is formed as the arranging recessed part.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 6(A) through 6(D) are views showing an output side bearing shown in FIG. 1.

FIGS. 7(A) through 7(C) are views showing the flat spring in FIG. 1.

FIGS. 9(A) and 9(B) are schematic views for explaining a formed trace of a welding protruded part shown in FIG. 2.

DETAILED DESCRIPTION OF THE PREFERRED EMBODIMENTS

An embodiment of the present invention will be described below with reference to the accompanying drawings.

Figure 1:
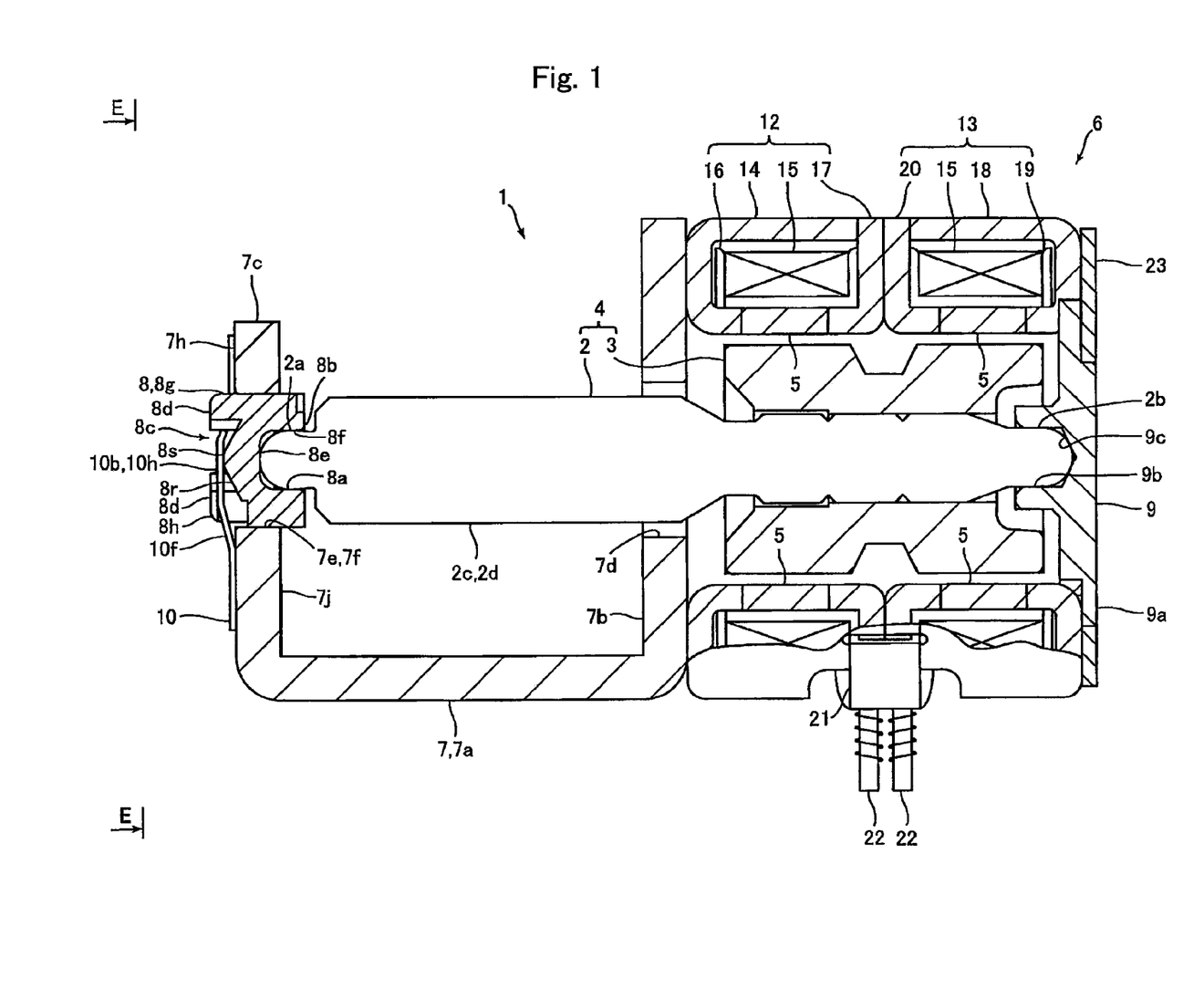
FIG. 1 is a sectional side view showing a motor in accordance with an embodiment of the present invention.

FIG. 1 is a sectional side view showing a motor 1 in accordance with an embodiment of the present invention.

The motor 1 in this embodiment is a so-called PM (Permanent Magnet) type stepping motor. The motor 1 includes, as shown in FIG. 1, a rotor 4 having a rotation shaft 2 and a permanent magnet 3 formed in a cylindrical shape, a stator 6 having pole teeth 5 which is disposed on an outer side in a radial direction of the permanent magnet 3 so as to face the permanent magnet 3, and a frame 7 which is attached to the stator 6 on an output side of the rotation shaft 2. Further, the motor 1 includes an output side bearing 8, which supports an end part 2a on the output side of the rotation shaft 2 (left end part in FIG. 1), an opposite-to-output side bearing 9, which supports an end part 2b on an opposite-to-output side of the rotation shaft 2 (right end part in FIG. 1), and a flat spring 10 as an urging member for urging the rotation shaft 2 to the opposite-to-output side.

In the following descriptions in this specification, a left side in FIG. 1 which is an output side of the rotation shaft 2 is referred to as "tip end side" and a right side in FIG. 1 which is an opposite-to-output side of the rotation shaft 2 is referred to as "rear end side". Further, upper and lower directions in FIG. 1 are referred to as "upper and lower directions" and directions perpendicular to the paper surface of FIG. 1 are referred to as "lateral (right and left) directions". Further, the end part 2a on the output side of the rotation shaft 2 is referred to as the "tip end part 2a" and the end part 2b on the opposite-to-output side of the rotation shaft 2 is referred to as the "rear end part 2b".

The rotation shaft 2 is formed of metal such as stainless steel, aluminum or brass. A tip end of the tip end part 2a and a rear end of the rear end part 2b of the rotation shaft 2 are formed in a hemispherical shape. Diameters of the tip end part 2a and the rear end part 2b are set to be smaller than a diameter of other portion of the rotation shaft 2. A permanent magnet 3 is fixed to a rear end part 2b side of the rotation shaft 2. A tip end part 2a side of the rotation shaft 2 is a protruded part 2c which protrudes from the stator 6. A lead screw 2d is formed on the protruded part 2c. The lead screw 2d is engaged, for example, with a moved body such as an optical pickup device or the like to move the moved body.

The stator 6 is provided with a first stator assembly 12 and a second stator assembly 13. The first stator assembly 12 and the second stator assembly 13 are disposed so as to superpose on each other in an axial direction.

The first stator assembly 12 includes a first outer stator core 14, a first bobbin 16 around which a coil 15 is wound, and a first inner stator core 17 which sandwiches the first bobbin 16 together with the first outer stator core 14 therebetween. The first stator assembly 12 is disposed on an outer peripheral side of a tip end side portion of the permanent magnet 3. A plurality of pole teeth 5 which is formed in each of the first outer stator core 14 and the first inner stator core 16 is disposed on an inner peripheral side of the first bobbin 16 so that respective pole teeth 5 are alternately and adjacently disposed in a circumferential direction. In other words, the pole teeth 5 formed in the first outer stator core 14 and the pole teeth 5 formed in the first inner stator core 16 are disposed on the inner peripheral side of the first bobbin 16 so as to be alternately and adjacently arranged each other.

The second stator assembly 13 includes a second outer stator core 18, a second bobbin 19 around which a coil 15 is wound, and a second inner stator core 20 which sandwiches the second bobbin 19 together with the second outer stator core 18 therebetween. The second stator assembly 13 is disposed on an outer peripheral side of a rear end side portion of the permanent magnet 3. A plurality of pole teeth 5 which is formed in each of the second outer stator core 18 and the second inner stator core 20 is disposed on an inner peripheral side of the second bobbin 19 so that respective pole teeth 5 are alternately and adjacently disposed in a circumferential direction. In other words, the pole teeth 5 formed in the second outer stator core 18 and the pole teeth 5 formed in the second inner stator core 20 are disposed on the inner peripheral side of the second bobbin 19 so as to be alternately and adjacently arranged each other.

In this embodiment, an outer peripheral portion of the first outer stator core 14 functions as a case part for covering an outer peripheral portion of the coil 15. Similarly, an outer peripheral portion of the second outer stator core 18 functions as a case part for covering an outer peripheral portion of the coil 15.

A terminal block 21 projecting on an outer side in a radial direction is integrally formed with the first bobbin 16 and the second bobbin 19 at a position between the first bobbin 16 and the second bobbin 19 in the axial direction. Terminal pins 22 are fixed to the terminal block 21 for supplying an electric current to the coils 15. End parts of the coils 15 are wound around the terminal pins 22.

The opposite-to-output side bearing 9 is formed of resin and formed in a bottomed cylindrical shape having a flange part 9a which is disposed on the rear end side. The opposite-to-output side bearing 9 is formed with a bearing recessed part 9b, which is recessed from the tip end of the opposite-to-output side bearing 9 toward the rear end side and into which the rear end part 2b of the rotation shaft 2 is inserted. The rear end of the rear end part 2b of the rotation shaft 2 is abutted with a bottom face 9c of the bearing recessed part 9b. The bearing recessed part 9b is formed in a circular shape when viewed in the axial direction. An inner diameter of the bearing recessed part 9b is set to be slightly larger than a diameter of the rear end part 2b and thus a slightly gap is formed between an outer peripheral face in the radial direction of the rear end part 2b and an inner peripheral face of the bearing recessed part 9b, which is faced with the outer peripheral face in the radial direction of the rear end part 2b. The bottom face 9c of the bearing recessed part 9b is formed in a conical or a pyramidal shape.

As shown in FIG. 1, the rear end of the rotation shaft 2 which is urged toward the rear end side by the flat spring 10 (specifically, the rear end of the rear end part 2b which is formed in a hemispherical shape) is abutted with the bottom face 9c of the bearing recessed part 9b and thus the rear end of the rotation shaft 2 is supported in the radial direction and the axial direction by the opposite-to-output side bearing 9 through the bottom face 9c. Further, since the bottom face 9c of the bearing recessed part 9b is formed in a conical or a pyramidal shape, the opposite-to-output side bearing 9 is provided with a centering function of the rotation shaft 2. In other words, in the motor 1 in this embodiment, centering of the rotation shaft 2 is performed by the opposite-to-output side bearing 9. Further, in this embodiment, the bottom face 9c of the bearing recessed part 9b is formed in a conical or a pyramidal shape and thus the rear end of the rotation shaft 2 is brought into line contact with the bottom face 9c. Therefore, sliding loss between the rear end of the rotation shaft 2 and the opposite-to-output side bearing 9 is reduced.

A rear end face of the stator 6 (specifically, the rear end face of the second stator core 18) is fixed with an end plate 23 which is formed of a thin metal plate such as a stainless steel plate. For example, the end plate 23 is fixed to the rear end face of the stator 6 by welding. The opposite-to-output side bearing 9 is fixed to the stator 6 by the end plate 23. Specifically, a part of the flange part 9a is sandwiched between a part of the rear end face of the second outer stator core 18 and the end plate 23 in the axial direction and, as a result, the opposite-to-output side bearing 9 is fixed to the stator 6.

Figure 2:
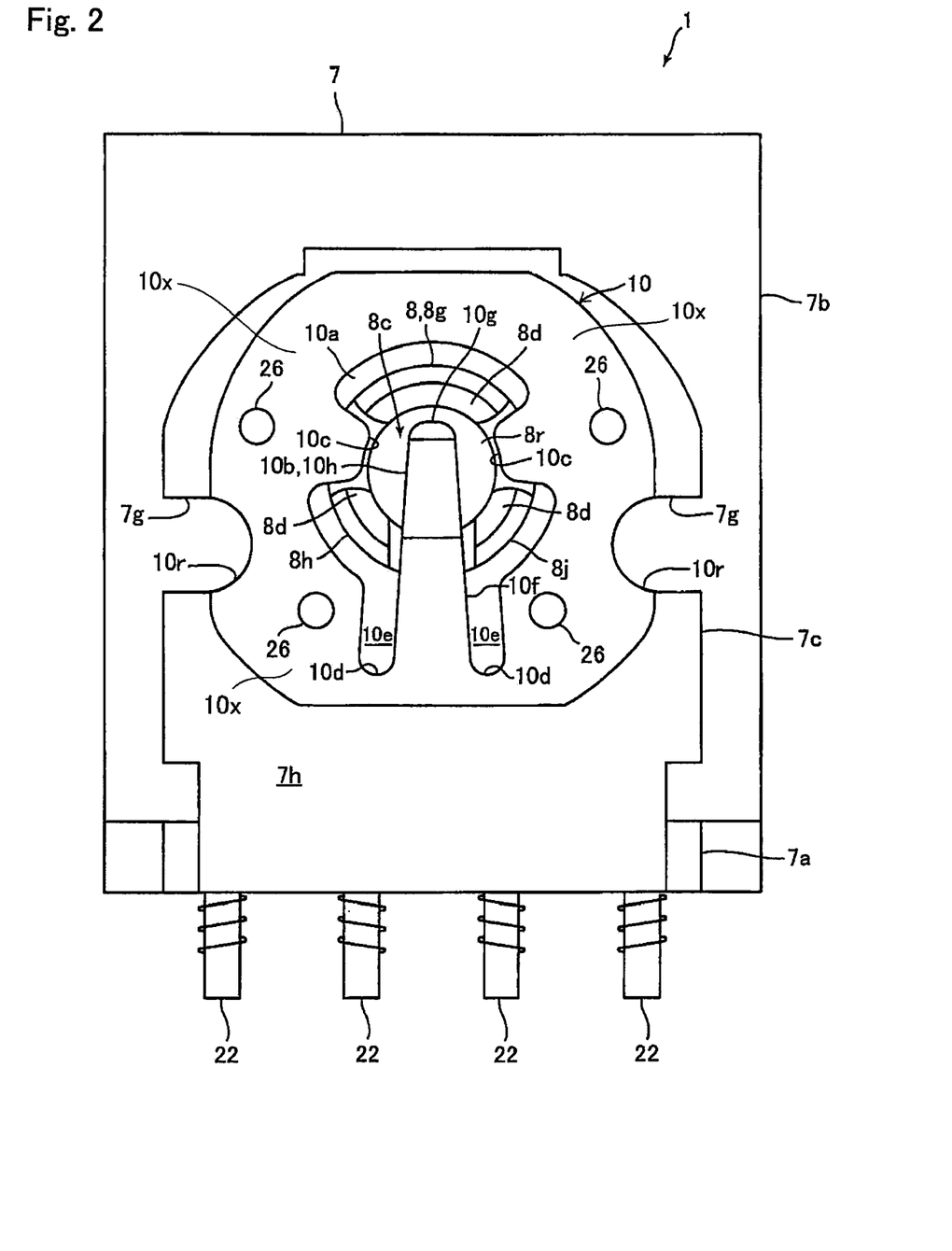
FIG. 2 is a view showing the motor which is viewed from the "E-E" direction in FIG. 1.
Figure 3:
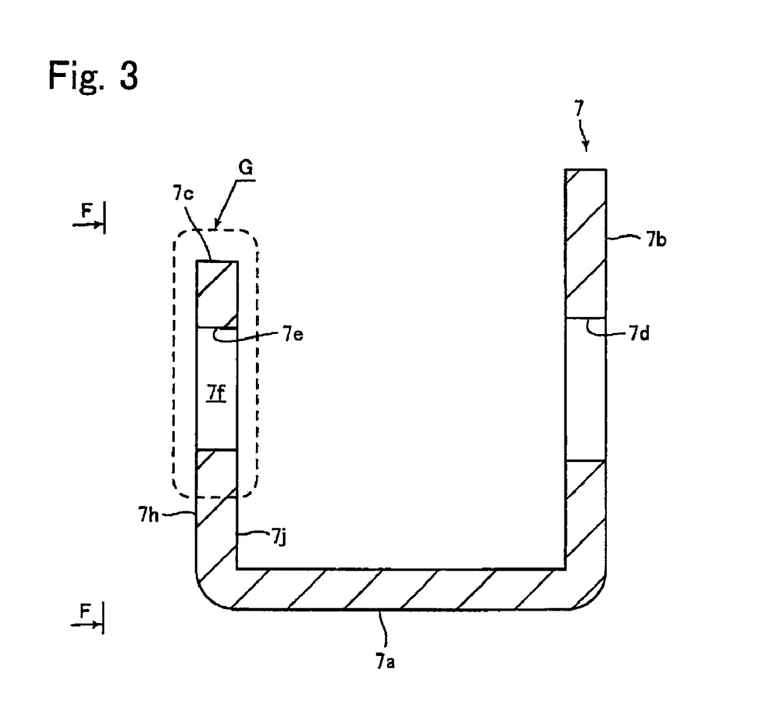
FIG. 3 is a sectional side view showing the frame in FIG. 1.
Figure 4:
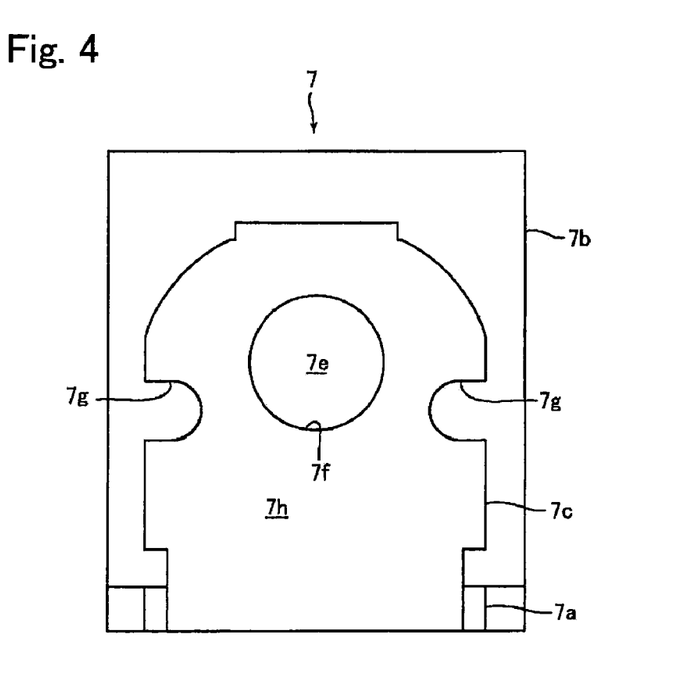
FIG. 4 is a view showing the frame which is viewed from the "F-F" direction in FIG. 3.
Figure 5:
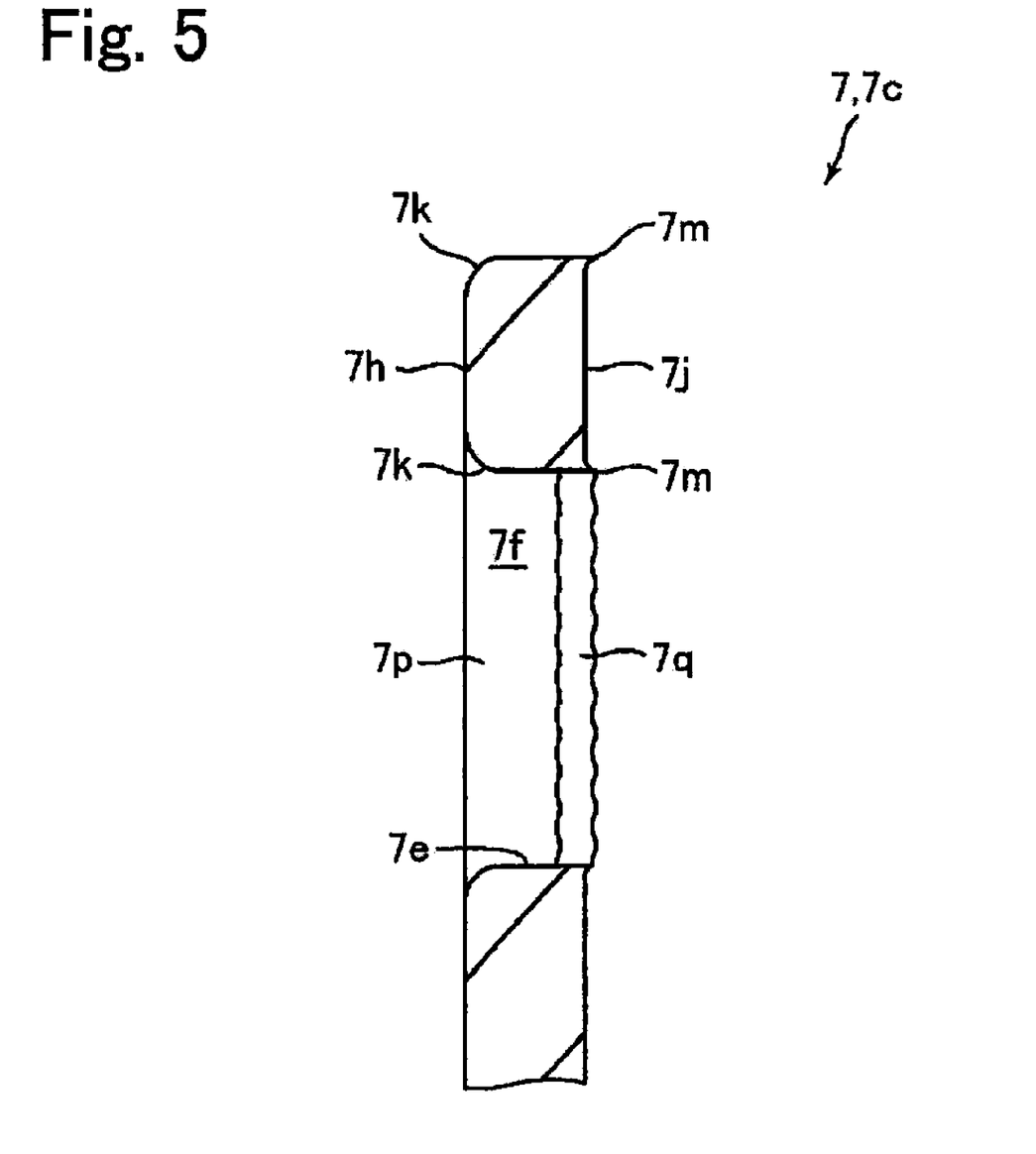
FIG. 5 is an enlarged sectional view showing the "G" part in FIG. 3.
Figure 6A:
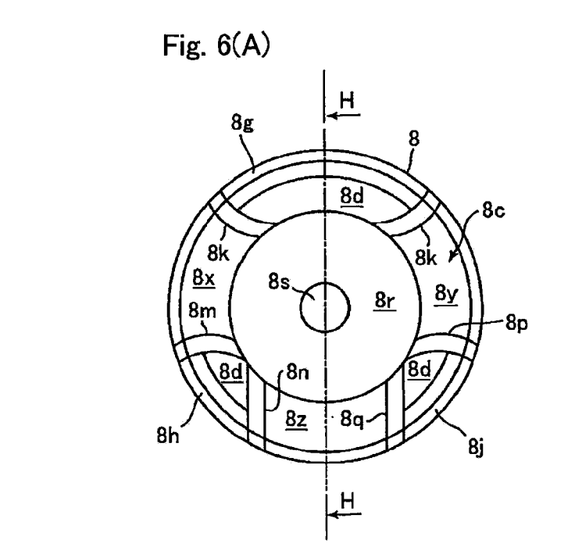
FIG. 6(A) is its front view.
Figure 6B:
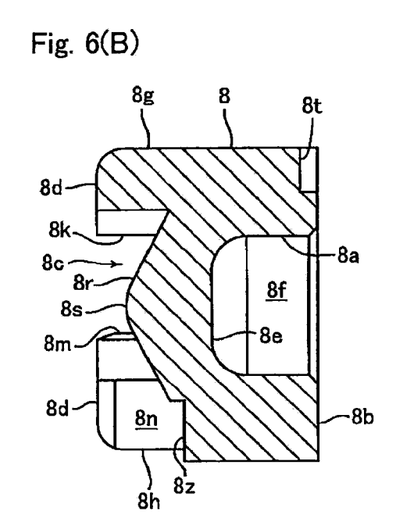
FIG. 6(B) is its sectional view showing the "H-H" cross section in FIG. 6(A)
Figure 6C:
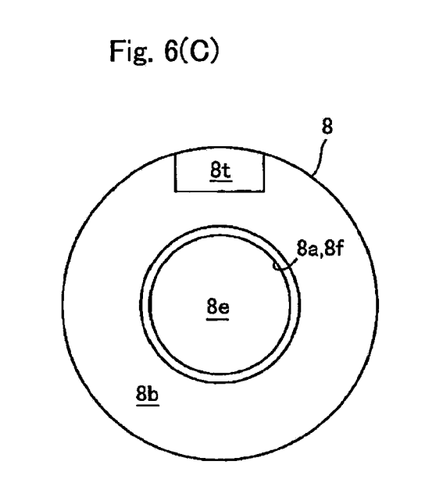
FIG. 6(C) is its rear view.
Figure 6D:
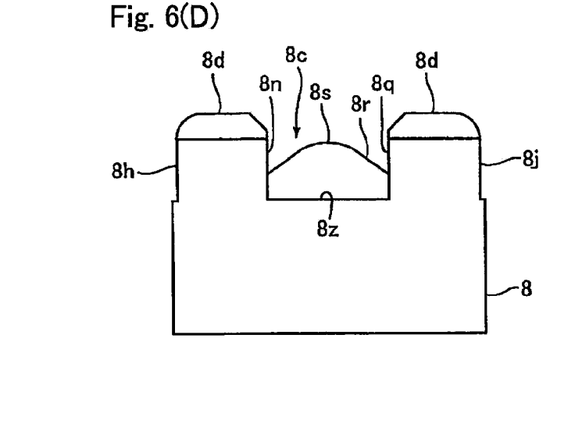
FIG. 6(D) is its bottom view.
Figure 7A:
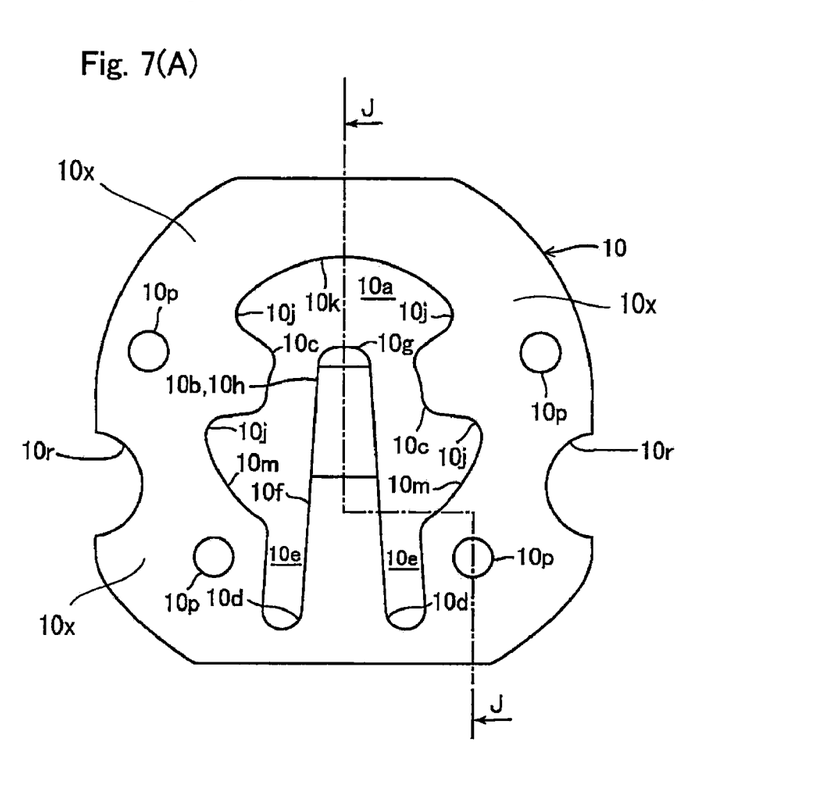
FIG. 7(A) is its front view.
Figure 7B:
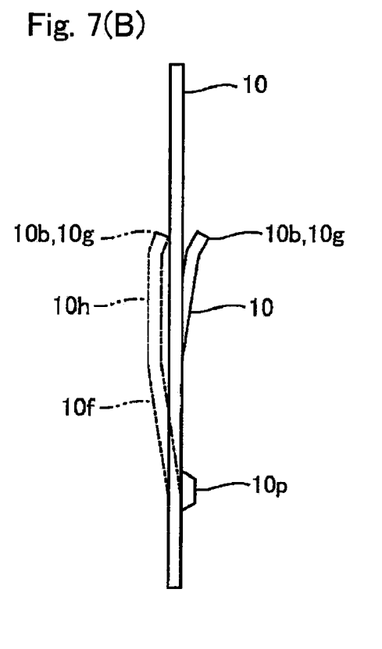
FIG. 7(B) is its side view.
Figure 7C:
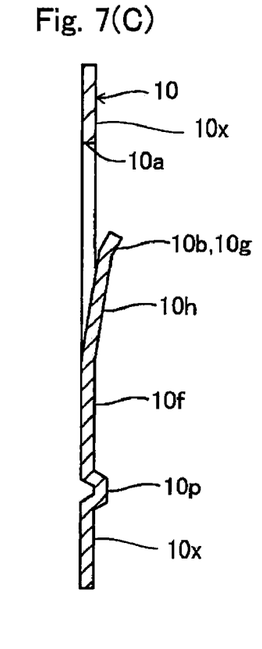
FIG. 7(C) is a sectional view showing the "J-J" cross section in FIG. 7(A).
Figure 8:
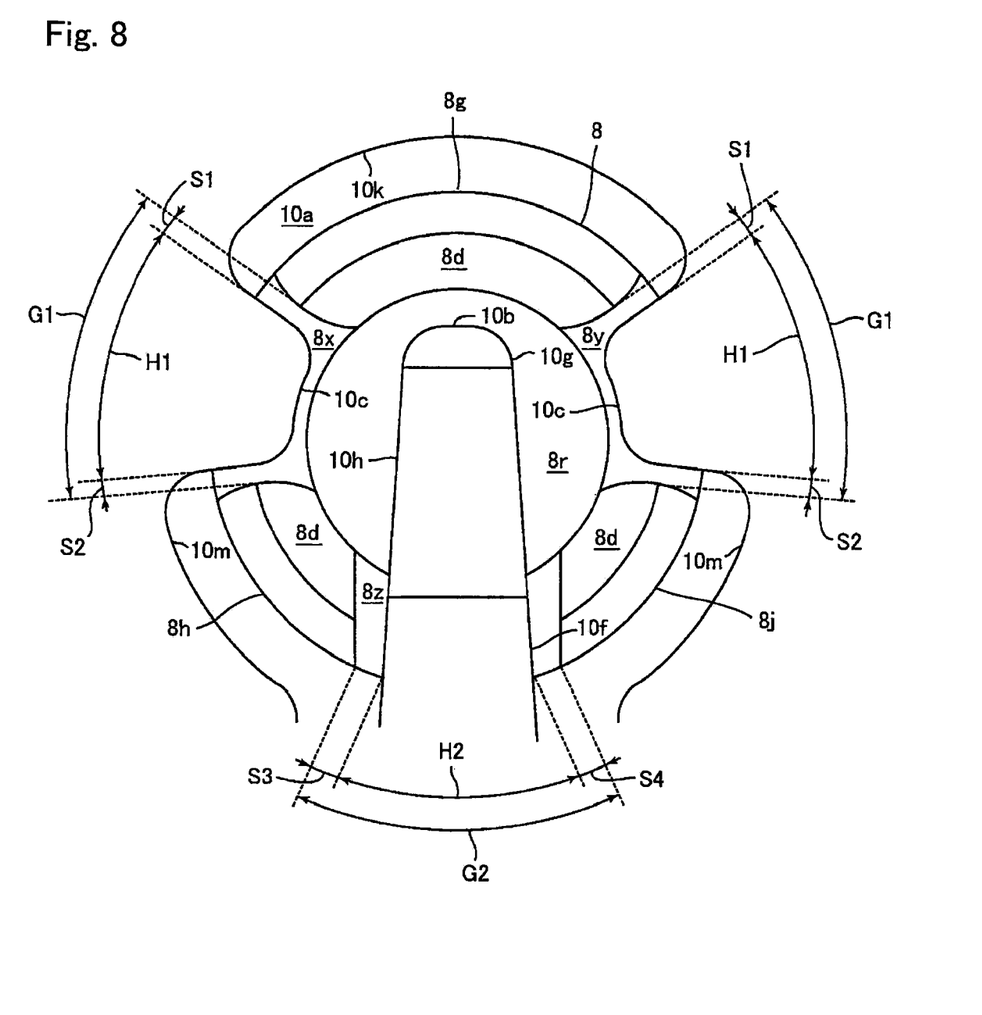
FIG. 8 is an enlarged view showing a center portion in FIG. 2.
Figure 9A:
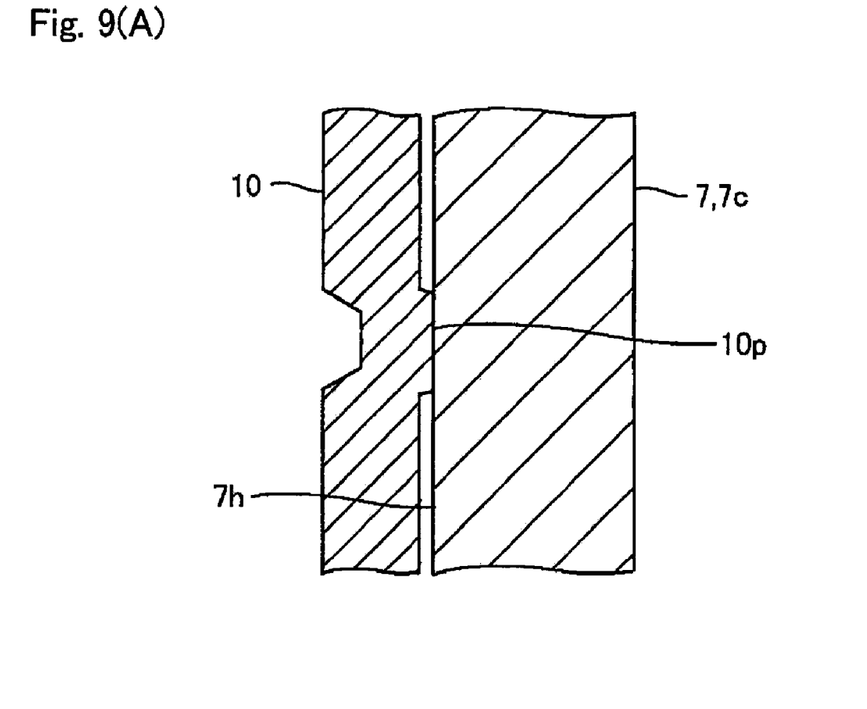
FIG. 9(A) is a view showing a state before welding and FIG. 9(B) is a view showing a state after welded.
Figure 9B:
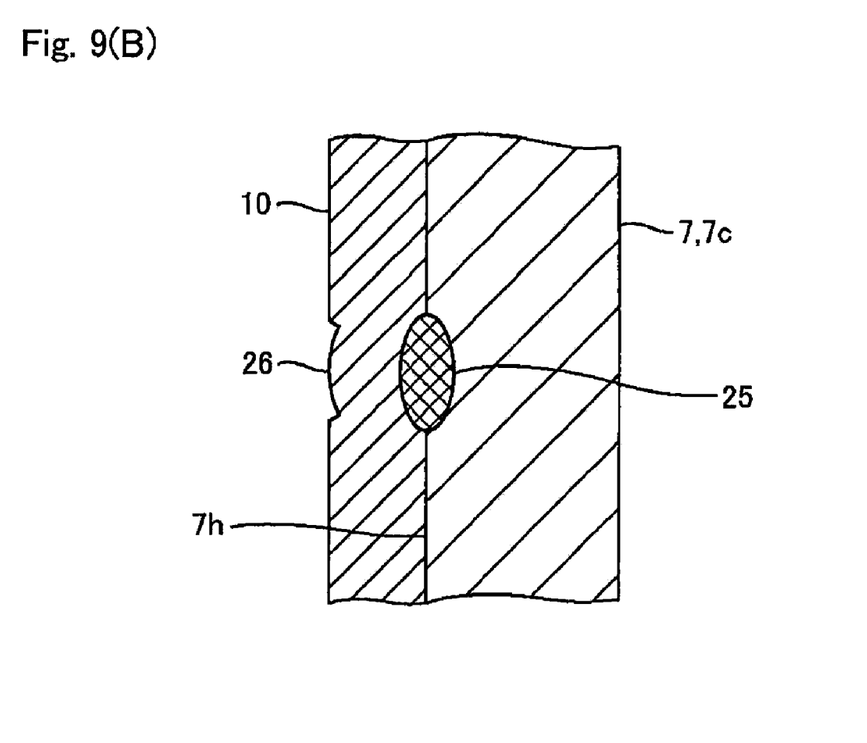

FIG. 2 is a view showing the motor 1 which is viewed from the "E-E" direction in FIG. 1. FIG. 3 is a sectional side view showing the frame 7 in FIG. 1. FIG. 4 is a view showing the frame 1 which is viewed from the "F-F" direction in FIG. 3. FIG. 5 is an enlarged sectional view showing the "G" part in FIG. 3. FIGS. 6(A) through 6(D) are views showing the output side bearing 8 shown in FIG. 1. FIG. 6(A) is its front view, FIG. 6(B) is its sectional view showing the "H-H" cross section in FIG. 6(A), FIG. 6(C) is its rear view, and FIG. 6(D) is its bottom view. FIGS. 7(A) through 7(C) are views showing the flat spring 10 in FIG. 1. FIG. 7(A) is its front view, FIG. 7(B) is its side view, and FIG. 7(C) is a sectional view showing the "J-J" cross section in FIG. 7(A). FIG. 8 is an enlarged view showing a center portion in FIG. 2. FIGS. 9(A) and 9(B) are schematic views for explaining a formed trace 26 of a welding protruded part 10p shown in FIG. 2. FIG. 9(A) is a view showing a state before welding and FIG. 9(B) is a view showing a state after welded.

The frame 7 is a metal frame which is formed of a metal thin plate such as electrogalvanized steel plate (SECC) or cold rolled steel plate (SPCC). A thickness of the frame 7 is, for example, 0.6 mm and thus the thickness of the frame 7 is very thin. The frame 7 includes a bottom face part 7a and two side face part 7b and 7c, which are formed to stand up from the bottom face part 7a and is disposed to face each other and thus the frame 7 is formed in a rectangular groove shape (U-shape in cross section). The frame 7 may be formed of another metal thin plate such as a stainless steel plate.

The side face part 7b is disposed on the rear end side and is fixed to the stator 6. In other words, the side face part 7b in this embodiment is a stator fixing part to which the stator 6 is fixed. The side face part 7c is disposed on the tip end side to support the tip end part 2a of the rotation shaft 2. Specifically, the side face part 7c holds the output side bearing 8 which supports the tip end part 2a of the rotation shaft 2. In other words, the side face part 7c is a shaft support part which supports the tip end part 2a of the rotation shaft 2 and, in addition, is also a bearing holding part which holds the output side bearing 8. The side face part 7b is fixed to the stator 6 by welding such as projection welding, spot welding or laser welding.

As shown in FIG. 1, the side face part 7b is formed with an insertion hole 7d, into which the rotation shaft 2 is inserted, so as to penetrate through the side face part 7b. A diameter of the insertion hole 7d is formed larger than a diameter of the rotation shaft 2 and thus a gap space is formed between the inner peripheral face of the insertion hole 7d and the rotation shaft 2.

As shown in FIGS. 3 and 4, the side face part 7c is formed with a circular bearing hole 7e, on which the output side bearing 8 is mounted, so as to penetrate through the side face part 7c. A diameter of the bearing hole 7e is formed slightly larger than a diameter of the output side bearing 8 and thus the output side bearing 8 which is mounted on the bearing hole 7e is movable along an inner peripheral face 7f of the bearing hole 7e in the axial direction. In this embodiment, the output side bearing 8 is movably supported by the inner peripheral face of the bearing hole 7e. In other words, the output side bearing 8 is movably supported through a board thickness of the side face part 7c in the axial direction.

Further, as shown in FIG. 4, the side face part 7c is formed with positioning recessed parts 7g for positioning the flat spring 10 to the side face part 7c. Specifically, two positioning recessed parts 7g are formed in the side face part 7c so as to recess from both ends of the side face part 7c toward inner sides in the lateral directions. Inner side ends in the lateral directions of the positioning recessed parts 7g are formed in a semicircular curved face.

The frame 7 in this embodiment is formed by press working. Specifically, the frame 7 is formed by press blanking work and press bending work. For example, an outward form of the bottom face part 7a and the side face parts 7b and 7c is formed by press blanking work and, after that, the side face parts 7b and 7c are bent at substantially 90° with respect to the bottom face part 7a by press bending work to form the frame 7. In this embodiment, the insertion hole 7d of the side face part 7b and the bearing hole 7e of the side face part 7c are formed by press blanking work when the outward form of the bottom face part 7a and the side face parts 7b and 7c is formed.

At the time of press blanking work for the frame 7, the frame 7 is punched from an outer side in the bending direction of the frame 7 toward an inner side in the bending direction, i.e., the frame 7 is punched from the outer side toward the inner side in FIG. 3. In other words, at the time of press blanking work, the side face part 7c is formed by means of that the frame 7 is punched from an output side face 7h disposed on an output side toward an opposite-to-output side face 7j disposed on an opposite-to-output side. Therefore, as shown in FIG. 5, edge parts of the output side face 7h (specifically, an upper edge part and both right and left edge parts of the output side face 7h and an edge part of the bearing hole 7e) are formed as a round part 7k at the time of press blanking work. On the other hand, a burr part 7m is formed at edge parts of the opposite-to-output side face 7j (specifically, an upper edge part and both right and left edge parts of the opposite-to-output side face 7j and an edge part of the bearing hole 7e) at the time of press blanking work. In FIG. 5, for convenience, the round part 7k and the burr part 7m are exaggeratedly shown.

Further, in the inner peripheral face 7f of the bearing hole 7e in this embodiment, as shown in FIG. 5, a length of a sheared face 7p which is formed at the time of press blanking work (length in the axial direction, i.e., a board thickness direction of the side face part 7c) is set to be longer than a length of a fracture face 7q (length in the axial direction, i.e., the board thickness direction of the side face part 7c). For example, the length of the sheared face 7p is set to be 70% or more of the board thickness of the side face part 7c and, specifically, 90% or more of the board thickness of the side face part 7c. Further, in the inner peripheral face 7f of the bearing hole 7e in this embodiment, an area of the sheared face 7p is larger than an area of the fracture face 7q. For example, the area of the sheared face 7p is set to be 70% or more than the entire area of the inner peripheral face 7f and, specifically, 90% or more than the entire area of the inner peripheral face 7f. In this embodiment, the bearing hole 7e is formed by, for example, a so-called shaving work in which finish blanking work is performed after a prepared hole has been opened.

The output side bearing 8 is formed of resin. For example, the output side bearing 8 is formed of resin such as PBT (polybutylene terephthalate), LCP (liquid crystal polymer), POM (polyacetal) or PPS (polyphenylene sulfide). The output side bearing 8 is formed in a bottomed cylindrical shape whose opposite-to-output side (rear end side) is opened. The output side bearing 8 is inserted into the bearing hole 7e of the frame 7 in a state that the output side bearing 8 is movable in the axial direction. Specifically, as shown in FIG. 1, the output side bearing 8 is disposed on the bearing hole 7e in a state that both ends of the output side bearing 8 in the axial direction are protruded from the output side face 7h and the opposite-to-output side face 7j of the side face part 7c. In other words, in this embodiment, a length in the axial direction of the output side bearing 8 is set to be longer than the board thickness of the frame 7. In accordance with an embodiment of the present invention, the output side bearing 8 may be formed of metal material which is superior in sliding property such as copper based sintered metal material.

As shown in FIGS. 6(A) through 6(D), the output side bearing 8 is formed with a bearing recessed part 8a, into which the tip end part 2a of the rotation shaft 2 is inserted, so as to recess from the rear end face 8b of the output side bearing 8 toward the tip end side. Further, the output side bearing 8 is formed with an arranging recessed part 8c, on which the flat spring 10 is disposed, so as to be recessed from the tip end face 8d toward the rear end side.

As shown in FIG. 6(C), the bearing recessed part 8a is formed in a circular shape when viewed in the axial direction and an inner diameter of the bearing recessed part 8a is set to be slightly larger than a diameter of the tip end part 2a of the rotation shaft 2. Further, a bottom face 8e of the bearing recessed part 8a is formed in a flat shape. In this embodiment, an inner peripheral face 8f of the bearing recessed part 8a supports the tip end part 2a of the rotation shaft 2 in the radial direction. Further, in this embodiment, the output side bearing 8 is urged toward the rear end side by the flat spring 10 and thus the bottom face 8e is contacted with the tip end part 2a of the rotation shaft 2 to support in the axial direction. In other words, in this embodiment, the tip end part 2a of the rotation shaft 2 is rotatably supported by the inner peripheral face 8f and the bottom face 8e of the bearing recessed part 8a in the axial direction and the radial direction.

As shown in FIG. 6(A), the arranging recessed part 8c is formed in a roughly "T"-shape. In other words, an outer peripheral portion of the tip end side of the output side bearing 8 is formed with three projecting parts 8g, 8h and 8j which protrude toward the tip end side in a state having predetermined spaces in the circumferential direction. Specifically, three projecting parts 8g through 8j are formed at a roughly 120° pitch. Further, flat parts 8x, 8y and 8z which are perpendicular to the axial direction are formed between the respective projecting parts 8g through 8j in the circumferential direction. Outer peripheral faces of the projecting parts 8g through 8j structure a part of the outer peripheral face of the output side bearing 8.

As shown in FIG. 6(A), the projecting part 8g is symmetrically formed in the right and left directions and is disposed on an upper end side of the output side bearing 8. Both ends 8k in the circumferential direction of the projecting part 8g is formed in a curved face shape. The projecting part 8h is disposed on a left hand side of a lower end side of the output side bearing 8. A clockwise direction end 8m of the projecting part 8h is formed in a curved face shape and a counterclockwise direction end 8n is formed in a flat face which is parallel to a plane formed in the axial direction and the upper and lower directions. Further, the projecting part 8j is disposed on a right side of the lower end side of the output side bearing 8. A counterclockwise direction end 8p of the projecting part 8j is formed in a curved face shape and a clockwise direction end 8q is formed in a flat face which is parallel to a plane formed in the axial direction and the upper and lower directions. In this embodiment, the projecting part 8h and the projecting part 8j are symmetrically formed in the right and left directions.

The flat part 8x is formed between the projecting part 8g and the projecting part 8h, and the flat part 8y is formed between the projecting part 8g and the projecting part 8j. Further, the flat part 8z is formed between the projecting part 8h and the projecting part 8j.

A spring abutting part 8r with which the flat spring 10 is abutted is formed at a center position in the radial direction of the arranging recessed part 8c so as to protrude toward the tip end side. Specifically, the spring abutting part 8r which protrudes in a substantially conical shape toward the tip end side is formed at the center portion in the radial direction of the arranging recessed part 8c. A protruding amount of the spring abutting part 8r is set to be smaller than protruding amounts of the projecting parts 8g through 8j. For example, as shown in FIG. 6(B), the protruding amount of the spring abutting part 8r is approximately half of the protruding amounts of the projecting parts 8g through 8j. The tip end 8s of the spring abutting part 8r is formed in a smooth surface shape.

In this embodiment, a space in the axial direction which is formed between the flat parts 8x through 8z and the spring abutting part 8r and the tip ends 8d of the output side bearing 8 is the arranging recessed part 8c.

Further, as shown in FIGS. 6(B) and 6(C), a confirming recessed part 8t is formed on the rear end face 8b of the output side bearing 8 for confirming a mounting direction of the output side bearing 8, which is formed in a bottomed cylindrical shape, on the frame 7.

The flat spring 10 is formed of a metal thin plate such as a stainless steel plate. For example, a thickness of the flat spring 10 is 0.1 mm. The flat spring 10 in this embodiment is formed by press working. Specifically, the flat spring 10 is formed by press blanking work and press bending work. At the time of press blanking work for the flat spring 10, the flat spring 10 is punched from a right side toward a left side in FIG. 7(B). In other words, the flat spring 10 is punched by press blanking work so that, when the flat spring 10 has been attached on the output side face 7h of the frame 7, round parts formed by the press blanking work are located on the rear end side and burr parts are located on the tip end side, i.e., so that the burr parts are not located on the face of the flat spring 10 which faces the output side face 7h of the frame 7. As shown in FIG. 7(A), the flat spring 10 is formed of a flat plate in a roughly circular shape and a through hole 10a is formed at a center portion of the flat spring 10. Further, the flat spring 10 is formed with the bearing abutting part 10b, which is abutted with the spring abutting part 8r of the output side bearing 8 to urge the output side bearing 8 toward the opposite-to-output side (rear end side), and two protruded parts 10c as a slipping-out preventive part for preventing the output side bearing 8 from coming out from the bearing hole 7e of the frame 7.

The bearing abutting part 10b is formed to protrude from an edge portion 10d on the lower end side of the through hole 10a toward the center side of the through hole 10a in an elongated shape. Further, the bearing abutting part 10b is, as shown in FIG. 7(B), formed so as to resiliently bend toward the tip end side with the lower end side as a supporting point The through hole 10a is extended on the right and left sides of the bearing abutting part 10b in a slit-like manner toward the lower direction for securing an urging force of the bearing abutting part 10b. In other words, slit parts 10e structuring a part of the through hole 10a are formed on the right and left sides of the bearing abutting part 10b.

Further, as shown in FIG. 7(C), the bearing abutting part 10b is bent at two positions toward the rear end side and is structured of a lower end part 10f which is disposed on the lower end side, an upper end part 10g disposed on the upper end, and an intermediate part 10h disposed between the lower end part 10f and the upper end part 10g. In this embodiment, when the flat spring 10 has been assembled into the motor 1, as shown in FIG. 1, the lower end part 10f is resiliently bent and the intermediate part 10h is abutted with the tip end 8s of the spring abutting part 8r. Further, the upper end of the upper end part 10g is disposed within the arranging recessed part 8c on the rear end side with respect to the tip end 8s of the spring abutting part 8r of the output side bearing 8.

The protruded parts 10c are formed to protrude from edge portions 10j of the right and left end sides of the through hole 10a toward the center side of the through hole 10a. The protruded part 10c is, as shown in FIG. 7(A), formed in a roughly trapezoid shape. Further, two protruded parts 10c are disposed in a symmetrical manner in the right and left directions. In this embodiment, the flat spring 10 is fixed on the output side face 7h of the frame 7b by means of that a flat face part 10x on its outer peripheral side is welded, and the protruded parts 10c are protruded toward the bearing abutting part 10b from the flat face part 10x that is welded and fixed for preventing the output side bearing 8 from coming out from the bearing hole 7e toward the tip end side.

An edge portion 10k of the flat face part 10x along the through hole 10a between the two protruded parts 10c is formed in a circular arc shape. Further, edge portions 10m of the flat face part 10x along the through hole 10a between the protruded parts 10c and the slit parts 10e are formed in a circular arc shape.

The flat spring 10 in this embodiment is fixed on the output side face 7h of the frame 7 by means of that the flat face part 10x is welded. Specifically, the flat spring 10 is fixed on the output side face 7h by projection welding. In this embodiment, the flat spring 10 is formed with welding protruded parts 10p on the flat face part 10x for performing projection welding. In other words, the flat spring 10 before being fixed and welded on the output side face 7h is formed with the welding protruded parts 10p.

Specifically, the welding protruded parts 10p which protrude toward the rear end side are formed in the flat face part 10x in the flat spring 10 before having been fixed to the output side face 7h. As shown in FIG. 7(A), in this embodiment, the welding protruded part 10p is formed at four positions. Specifically, the welding protruded parts 10p are formed near respective root portions of the two protruded parts 10c and outer sides of the slit parts 10e in the lateral direction. In accordance with an embodiment of the present invention, the welding protruded part 10p is formed at the time of press working. Further, in order to secure a stable urging force by the bearing abutting part 10b, the welding protruded parts 10p are preferably formed at least outer sides of the slit parts 10e in the lateral directions (i.e., root portions of the bearing abutting part 10b).

Further, an outer peripheral side of the flat spring 10 is formed with positioning recessed parts 10r for positioning the flat spring 10 to the side face part 7c together with the positioning recessed parts 7g formed in the frame 7. Specifically, two positioning recessed parts 10r are formed in the flat spring 10 so as to recess from both ends of the flat spring 10 in the lateral directions toward inner sides in the lateral directions. The positioning recessed parts 10r are, as shown in FIG. 2, formed in a semicircular curved face similarly to the inner side ends in the lateral directions of the positioning recessed parts 7g formed in the frame 7.

As described above, the flat spring 10 is fixed to the output side face 7h of the frame 7 by welding. As shown in FIGS. 1 and 2, the bearing abutting part 10b and the protruded parts 10c of the flat spring 10 fixed to the output side face 7h are disposed within the arranging recessed part 8c of the output side bearing 8 which is disposed in the bearing hole 7e of the frame 7. Specifically, the respective protruded parts 10c are disposed in the arranging recessed part 8c between the projecting part 8g and the projecting part 8h and between the projecting part 8g and the projecting part 8j, and the bearing abutting part 10b (specifically, the intermediate part 10h and a part of the lower end part 10) is disposed in the arranging recessed part 8c between the projecting part 8h and the projecting part 8j. Further, the bearing abutting part 10b (specifically, the intermediate part 10h) of the flat spring 10 fixed to the output side face 7h is abutted with the tip end 8s of the spring abutting part 8r of the output side bearing 8.

In this embodiment, as shown in FIG. 8, a difference between a distance "G1", which is between the projecting part 8h or the projecting part 8j and the projecting part 8g in a circumferential direction, and a width "H1" of the protruded part 10c in the circumferential direction is set to be smaller than a difference between a distance "G2", which is between the projecting part 8h and the projecting part 8j in the circumferential direction, and a width "H2" of the bearing abutting part 10b (specifically, the lower end part 10f) in the circumferential direction. In other words, a sum of a gap space "S1" between the projecting part 8g and the protruded part 10c in the circumferential direction and a gap space "S2" between the projecting part 8h or the projecting part 8j and the protruded part 10c in the circumferential direction is set to be smaller than a sum of a gap space "S3" between the projecting part 8h and the bearing abutting part 10b in the circumferential direction and a gap space "S4" between the projecting part 8j and the bearing abutting part 10b in the circumferential direction.

In this embodiment, the bearing abutting part 10b and the protruded parts 10c which are disposed in the arranging recessed part 8c are disposed on the rear end side with respect to the tip end 8d of the output side bearing 8 so as not to protrude from the tip end 8d of the output side bearing 8 in the axial direction.

Further, as described above, the flat spring 10 is fixed to the output side face 7h of the frame 7 by projection welding. In other words, as shown in FIG. 9(A), in a state that a welding protruded part 10p of the flat spring 10 is abutted with the output side face 7h with a predetermined pressure, electrodes are arranged and power is supplied to the electrodes to fix the flat spring 10 to the output side face 7h. Therefore, as shown in FIG. 9(B), a welded part (projection welded part) 25 where the flat spring 10 and the output side face 7h are fixed to each other by welding is formed between the flat spring 10 and the output side face 7h. Further, as shown in FIGS. 2 and 9(B), the flat spring 10 fixed by welding is formed with a welding trace 26 of the welding protruded part 10p. In this embodiment, the welded part 25 and the welding trace 26 are formed at four positions, i.e., in the vicinity of each of the root portions of the two protruded parts 10c and the outer sides of the slit parts 10e in the lateral directions.

In this embodiment, no protruded part for projection welding is formed on the side face part 7c before being welded and instead, the welding protruded part 10p for projection welding is formed on the flat spring 10 before welding. Therefore, deformation of the bearing hole 7e is prevented which may occur due to forming of welding protruded parts on the side face part 7c. Especially, in this embodiment, the output side bearing 8 is urged by the flat spring 10 to the opposite-to-output side and held in the state that the output side bearing 8 is slidable along the inner peripheral face of the bearing hole 7e in the axial direction. Therefore, since deformation of the bearing hole 7e is prevented, the output side bearing 8 is capable of being moved in the axial direction smoothly.

As described above, in accordance with an embodiment of the present invention, the output side bearing 8 is movably disposed on the bearing hole 7e of the frame 7 in the axial direction in the state that the tip end part 2a of the rotation shaft 2 is inserted into the bearing recessed part 8a. Further, the output side bearing 8 is urged to the opposite-to-output side by the flat spring 10. In other words, in this embodiment, the flat spring 10 does not abut with the rotation shaft 2. Therefore, in this embodiment, occurrence of noise during rotation of the rotation shaft 2 and abrasion of the rotation shaft 2 and the flat spring 10, which are caused by sliding of the metal rotation shaft 2 with the metal flat spring 10 are prevented.

In accordance with an embodiment of the present invention, the frame 7 is formed by press blanking work and, the area of the sheared face 7p on the inner peripheral face 7f of the bearing hole 7e is larger than an area of the fracture face 7q. Therefore, the surface of the inner peripheral face 7f of the bearing hole 7e is relatively smooth. Further, the sheared face 7p is smoother than the fracture face 7q and unevenness formed on the sheared face 7p is smaller than unevenness formed on the fracture face 7q and thus variation of the diameter of the bearing hole 7e in the axial direction is restrained and inclination of the output side bearing 8 disposed on the bearing hole 7e is suppressed. Accordingly, in this embodiment, the output side bearing 8 which is disposed on the bearing hole 7e can be moved smoothly in the axial direction.

In addition, in accordance with an embodiment of the present invention, the flat spring 10 is punched by press blanking work so that, when the flat spring 10 is welded and fixed to the output side face 7h of the frame 7, the burr parts are not located on the face of the flat spring 10 which faces the output side face 7h of the frame 7. Accordingly, the welding protruded part 10p of the flat spring 10 and the output side face 7b are further surely brought into close contact with each other at the time of welding. As a result, the flat spring 10 and the frame 7 are further firmly fixed to each other and thus impact resistance of the motor 1 is surely improved.

In accordance with an embodiment of the present invention, the flat spring 10 is formed with the protruded part 10c for preventing coming-off of the output side bearing 8 from the bearing hole 7e. Therefore, the output side bearing 8 is not required to form a portion for preventing the coming-off of the output side bearing 8. Accordingly, the structure of the output side bearing 8 is simplified to reduce the size of the output side bearing 8. As a result, the size of the motor 1 is capable of being reduced in the axial direction. Further, the structure of the output side bearing 8 is capable of being simplified and thus, even when the output side bearing 8 is small, the output side bearing 8 can be manufactured easily.

In accordance with an embodiment of the present invention, the bearing abutting part 10b of the flat spring 10 is disposed within the arranging recessed part 8c formed on the output side bearing 8 and thus the bearing abutting part 10b is not protruded from the tip ends 8d of the output side bearing 8. Therefore, the size of the motor 1 is capable of being reduced in the axial direction. Further, the bearing abutting part 10b can be prevented from abutting with a structure member of the host device on which the motor 1 is mounted or a finger of a user. Therefore, since contacting of the structure member of the host device with the bearing abutting part 10b is prevented, deformation of the bearing abutting part 10b due to contacting with the structure member of the host device is prevented and an appropriate urging force of the flat spring 10 is maintained. Further, since contacting of a finger of a user with the bearing abutting part 10b is prevented, the user is prevented from being hurt.

In accordance with an embodiment of the present invention, the protruded part 10c which is formed in the flat spring 10 is disposed between the projecting part 8g and the projecting part 8h of the output side bearing 8 and between the projecting part 8g and the projecting part 8j. Therefore, with the use of the protruded parts 10c for preventing the coming-off of the output side bearing 8 and the projecting parts 8g through 8j, the rotation quantity of the output side bearing 8 to the bearing hole 7e can be restricted. Further, the projecting parts 8g through 8j structure a part of the outer peripheral face of the output side bearing 8. Therefore, even when the board thickness of the frame 7 is very small, for example, 0.6 mm like the embodiment described above, moving amount in the axial direction of the output side bearing 8 to the bearing hole 7e can be secured by utilizing the projecting parts 8g through 8j.

In accordance with an embodiment of the present invention, the sum of the gap space "S1" between the projecting part 8g and the protruded part 10c in the circumferential direction and the gap space "S2" between the projecting part 8h or the projecting part 8j and the protruded part 10c is set to be smaller than the sum of the gap space "S3" between the projecting part 8h and the bearing abutting part 10b in the circumferential direction and the gap space "S4" between the bearing abutting part 10b and the projecting part 8j. Therefore, even when the output side bearing 8 is rotated with rotation of the rotation shaft 2, contacting of the bearing abutting part 10b and the projecting parts 8h and 8j are prevented. Accordingly, deformation of the bearing abutting part 10b due to contacting with the projecting parts 8h and 8j is prevented and thus the output side bearing 8 is adequately urged by the bearing abutting part 10b.

In accordance with an embodiment of the present invention, the opposite-to-output side bearing 9 for supporting the rear end part 2b of the rotation shaft 2 is fixed to the rear end face of the second outer stator core 18 and, in addition, the opposite-to-output side bearing 9 is provided with a centering function. In other words, the output side bearing 8 which is disposed at a position apart from the permanent magnet 3 and the stator 6 is not provided with a centering function but the fixed opposite-to-output side bearing 9 which is disposed at a near position to the permanent magnet 3 and the stator 6 is provided with a centering function. Therefore, occurrence of noise during rotation of the motor 1 is restrained. Further, durability of the opposite-to-output side bearing 9 is improved.

Although the present invention has been shown and described with reference to a specific embodiment, various changes and modifications will be apparent to those skilled in the art from the teachings herein.

In the embodiment described above, the protruded part 10c is formed in the flat spring 10 for preventing the coming-off of the output side bearing 8 from the bearing hole 7e of the frame 7. However, the present invention is not limited to this embodiment. For example, instead of forming the protruded part 10c in the flat spring 10, a slipping-out preventive part for preventing the coming-off of the output side bearing 8 from the bearing hole 7e may be formed in the output side bearing 8. In this case, for example, a flange part extending on an outer side in the radial direction is formed on the rear end side of the output side bearing 8.

In the embodiment described above, two protruded parts 10c are formed in the flat spring 10 but the number of the protruded parts 10c formed in the flat spring 10 may be one, or three or more.

In the embodiment described above, the output side bearing 8 is urged to the opposite-to-output side by the flat spring 10. However, the present invention is not limited to this embodiment. For example, the output side bearing 8 may be urged to the opposite-to-output side by a compression coil spring, washer spring or the like. In this case, the compression coil spring or the washer spring are disposed so as to abut with the tip end 8s of the spring abutting part 8r. Further, in this case, for example, a holding member which holds the compression coil spring or the washer spring are fixed to the output side face 7h of the frame 7 by welding.

In the embodiment described above, the flat spring 10 is fixed to the output side face 7h of the frame 7 by projection welding. However, the present invention is not limited to this embodiment. For example, the flat spring 10 may be fixed to the output side face 7h by spot welding where the flat spring 10 and the output side face 7h are welded to each other by means of that power is supplied to electrodes in the state that the flat spring 10 and the output side face 7h are pressurized with the electrodes. Further, the flat spring 10 may be fixed to the output side face 7h by laser welding where the flat spring 10 and the output side face 7h are welded to each other by heat of a laser beam.

Further, the flat spring 10 may be fixed to the output side face 7h by a method other than the welding. For example, as described in the above-mentioned Patent References, engagement parts for engaging with the frame 7 may be formed in the flat spring 10 and the flat spring 10 is fixed to the frame 7 by utilizing elastic deformation of the engagement parts. Specifically, it may be structured that engagement parts for engaging with the frame 7 are formed to be bent from both sides on an outer peripheral side of the flat face part 10x of the flat spring 10. In this case, the side face part 7c of the frame 7 is pinched between the engagement parts and the flat face part 10x and the flat spring 10 is fixed to the frame 7 by utilizing elastic deformation of the engagement parts formed in the flat spring 10.

In the embodiment described above, the output side bearing 8 is directly inserted into the bearing hole 7e of the frame 7. However, a slide bearing such as a bush may be inserted into the bearing hole 7e and the output side bearing 8 is inserted into an inner peripheral face of the slide bearing.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
a rotor having a rotation shaft;
a stator which is disposed on an outer peripheral side of the rotor;
an output side bearing which supports an end part on an output side of the rotation shaft in a radial direction and an axial direction;
a frame which is provided with a bearing holding part for holding the output side bearing and which is fixed to the stator; and
an urging member which is attached to the bearing holding part for urging the output side bearing to an opposite-to-output side;
wherein the bearing holding part is formed with a bearing hole which penetrates through the bearing holding part and on which the output side bearing is disposed, and the output side bearing is disposed on the bearing hole in a movable state in the axial direction of the rotation shaft;
the urging member is a flat spring;
the flat spring is attached to an output side face of the bearing holding part and is provided with a slipping-out preventive part for preventing coming-off of the output side bearing from the bearing hole;
a through hole is formed at a center portion of the flat spring so as to penetrate through the flat spring;
the slipping-out preventive part comprises a plurality of protruded parts which is protruded toward a center side of the flat spring from an edge portion of the through hole for preventing the output side bearing from coming-off toward an output side;
the output side bearing is provided with a plurality of projecting parts projecting toward the output side and the protruded part is disposed between the plurality of the projecting parts; and
the flat spring is provided with a bearing abutting part which is protruded toward the center side of the flat spring from the edge portion of the through hole to abut with and urge the output side bearing, and
the bearing abutting part is disposed between the plurality of the projecting parts, and
a difference between a distance in a circumferential direction between the projecting parts, which are disposed on both sides of the protruded part in the circumferential direction of the rotation shaft, and a width of the protruded part in the circumferential direction is smaller than a difference between a distance in the circumferential direction between the projecting parts, which are disposed on both sides of the bearing abutting part in the circumferential direction of the rotation shaft, and a width of the bearing abutting part in the circumferential direction.

2. The motor according to claim 1, wherein the bearing hole is formed by press blanking work so that a length of sheared face in the axial direction of the rotation shaft is longer than a length of fracture face in the axial direction on an inner peripheral face of the bearing hole.

3. A motor comprising:

a rotor having a rotation shaft;

a stator which is disposed on an outer peripheral side of the rotor;

an output side bearing which supports an end part on an output side of the rotation shaft in a radial direction and an axial direction;

a frame which is provided with a bearing holding part for holding the output side bearing and which is fixed to the stator; and an urging member which is attached to the bearing holding part for urging the output side bearing to an opposite-to-output side;

wherein the bearing holding part is formed with a bearing hole which penetrates through the bearing holding part and on which the output side bearing is disposed, and the output side bearing is disposed on the bearing hole in a movable state in the axial direction of the rotation shaft;

the urging member is a flat spring which is provided with a bearing abutting part which is abutted with the output side bearing to urge the output side bearing;

the output side bearing is formed with an arranging recessed part which is recessed toward the opposite-to-output side from an output side end of the output side bearing for accommodating the bearing abutting part; and the bearing abutting part which is disposed in the arranging recessed part is always disposed on the opposite-to-output side of the output side end of the output side bearing so that the bearing abutting part of the flat spring is not protruded in the axial direction from the output side end of the output side bearing.

4. The motor according to claim 3, wherein the output side bearing is formed with a spring abutting part with which the bearing abutting part is abutted at a center position in the radial direction of the arranging recessed part, and the spring abutting part is formed in a conical shape which is protruded toward a tip end side, and the output side bearing is provided with a plurality of projecting parts which are protruded toward an output side, and the bearing abutting part is disposed between the plurality of the projecting parts, and a protruded amount of the spring abutting part is smaller than a projecting amount of the projecting part.

5. The motor according to claim 4, wherein a through hole penetrating through the flat spring is formed on a center side of the flat spring, and a plurality of protruded parts are provided which is protruded toward the center side of the flat spring from an edge portion of the through hole, and the projecting part is formed at least three positions with a predetermined space in a circumferential direction between respective projecting parts, and the plurality of the protruded parts are respectively disposed between the projecting parts which are located on both sides of the bearing abutting part.

6. The motor according to claim 5, wherein a portion between the plurality of the projecting parts is formed in a flat part perpendicular to the axial direction, and a space between the flat part, the spring abutting part and the output side end of the output side bearing is formed as the arranging recessed part.

7. The motor according to claim 1, wherein an opposite-to-output side bearing is fixed to an end face on an opposite-to-output side of the stator in a non-movable state, and an end part on the opposite-to-output side of the rotation shaft is rotatably supported by the opposite-to-output side bearing in the axial direction and the radial direction.

8. The motor according to claim 7, wherein the opposite-to-output side bearing is formed in a bottomed cylindrical shape having a bearing recessed part, and the end part on the opposite-to-output side of the rotation shaft is inserted into the bearing recessed part to be abutted with a bottom face of the bearing recessed part.

9. The motor according to claim 8, further comprising an end plate which is formed of a metal plate and which is fixed to the end face on the opposite-to-output side of the stator, wherein the opposite-to-output side bearing is fixed to the stator by the end plate in the non-movable state.

* * * * *